United States Patent [19]
Fukuda et al.

[11] Patent Number: 4,533,603
[45] Date of Patent: Aug. 6, 1985

[54] MAGNETIC RECORDING MEDIUM

[75] Inventors: Kazumasa Fukuda; Yoshimi Kitahara, both of Tokyo, Japan

[73] Assignee: TDK Electronics Co., Ltd., Tokyo, Japan

[21] Appl. No.: 419,474

[22] Filed: Sep. 17, 1982

[30] Foreign Application Priority Data

Nov. 16, 1981 [JP] Japan .................................. 56-182252

[51] Int. Cl.$^3$ ................................................ G11B 5/64
[52] U.S. Cl. ................................ 428/458; 204/192 M; 360/134; 360/135; 360/136; 427/128; 427/132; 428/694; 428/900
[58] Field of Search ........................ 427/132, 131, 128; 428/900, 692, 693, 694, 458; 204/192 M; 360/134–136

[56] References Cited

U.S. PATENT DOCUMENTS 4,260,466  7/1981  Shirahata .......................... 427/132

FOREIGN PATENT DOCUMENTS 1279741  6/1972  United Kingdom .

OTHER PUBLICATIONS

Matsumoto et al., "Magnetic Properties of MnAl and MnAlCu Evaporated Films", *J. of Appl. Mag. Sci. Assoc.* 5 (No. 2), 1981.

Primary Examiner—Ellis P. Robinson
Attorney, Agent, or Firm—Oblon, Fisher, Spivak, McClelland & Maier

[57] ABSTRACT

A magnetic recording medium comprises a substrate and a thin magnetic metal layer formed on the substrate by a sputtering method and composed essentially of Mn, Al and Cu.

3 Claims, 1 Drawing Figure

MAGNETIC RECORDING MEDIUM

BACKGROUND OF THE INVENTION

1. Field of the Invention

The present invention relates to a magnetic recording medium, and more particularly to a high density magnetic recording medium.

2. Description of the Prior Art

In recent years, there has been an increasing demand for high density recording media. In place of conventional magnetic recording media coated with magnetic paints, thin magnetic metal layers formed by plating, vapour deposition or sputtering without using a binder, are expected to be prospective recording media. The limit of the magnetic recording density is greately affected by the proportion of the demagnetizing field to the coercive force of the thin layer, and the strength of the demagnetizing field is related to the saturated magnetic flux density and the thickness of the thin layer. Further, it is necessary that the SN ratio is at least at an allowable level. As compared with the conventional coating type magnetic recording media, the thin magnetic metal layers having a greater saturated magnetic flux density, whereby a higher output is obtainable and a greater SN ratio is obtainable. Further, the thickness of the layer is thin and a relatively high coercive force is obtainable, whereby it is possible to substantially reduce the demagnetization of the magnetic recording.

As the major material for the thin magnetic metal layers, Co alloys such as Co—Si, Co—Fe—Ni and Co—Cr are commonly used. With these materials, however, there are some problems with respect to their costs and uncertainty of the steady supply of the raw materials in the future. These problems constitute a stumbling block against mass production.

Reflecting the recent trend for energy and resource conservations, various researches on the non-Co magnetic materials in which no Co is used, have been made. For instance, in the field of permanent magnets, it has been found that a magnet made of a Mn—Al—C alloy provides superior characteristics, as disclosed in Japanese Examined Patent Publication No. 31448/79.

Likewise in the field of thin layers, it has been reported that thin Mn—Al and Mn—Al—Cu layers formed by vapour deposition provide a maximum saturated magnetic flux density of 1,000 G and a maximum coercive force of 1,250 Oe and thus have excellent properties as magnetic recording media (for instance, in Journal of Applied Magnetic Science Association, Vol. 5, No. 2, 1981).

However, the Mn—Al and Mn—Al—Cu thin layers formed by a vapour deposition method have the following drawbacks. Namely, in the vapour deposition method, it is necessary to maintain the substrate at a temperature as high as from 300° to 400° C. at the time of vapour deposition. Therefore, a polymer film can not thereby be used as the substrate, and the method can not be applied to a magnetic tape or a flexible disc. Another substantial disadvantage is that the saturated magnetic flux density thereby obtainable is lower by about an order of tens than that obtainable by a Co thin film.

SUMMARY OF THE INVENTION

It is expected that the saturated magnetic flux density will be increased by incorporating Cu in the Mn—Al alloy in an amount within a certain range although the coercive force may thereby be decreased to some extent. The present inventors have conducted extensive researches on the film-forming technique to prepare a thin magnetic metal layer for a magnetic recording medium from a Mn—Al—Cu alloy without leading to the drawbacks inherent to the above mentioned vapour deposition method.

As a result, it has been found that with use of a sputtering method, particularly a magnetron sputtering method, as the film-forming technique, it is possible to prepare a thin magnetic Mn—Al—Cu metal layer having excellent properties as a magnetic recording medium even at such a low substrate temperature that a polymer film can be used as the substrate.

The present invention provides a magnetic recording medium comprising a substrate and a thin magnetic metal layer formed on the substrate by a sputtering method and composed essentially of Mn, Al and Cu.

Now the present invention will be described in further details.

DETAILED DESCRIPTION OF THE PREFERRED EMBODIMENTS

Figure 1:
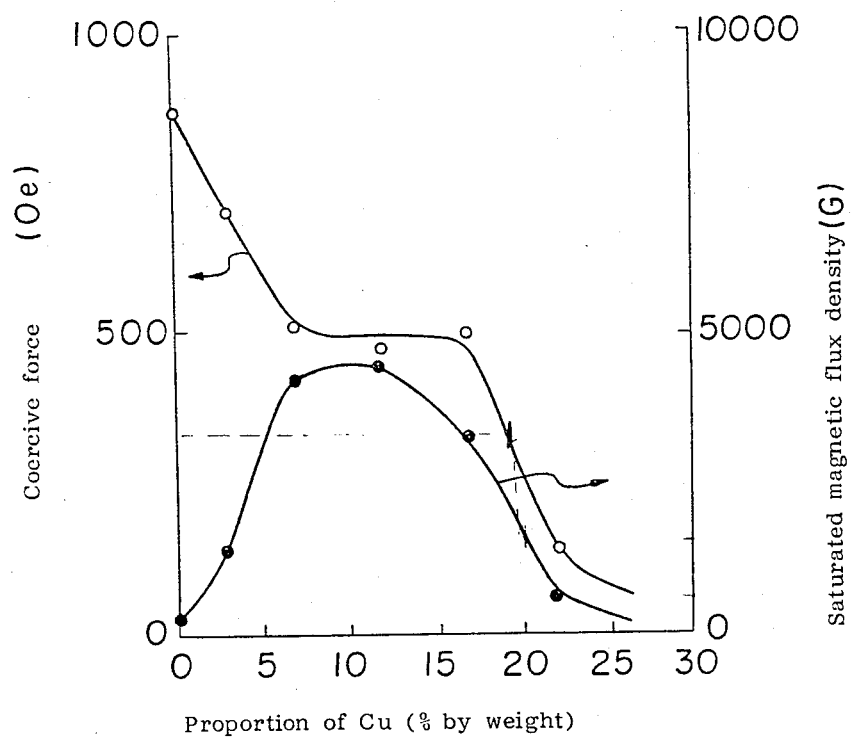
FIG. 1 is a graph illustrating changes in the magnetic properties of a thin Mn—Al—Cu layer when the proportion of Cu is varied.

The sputtering method is a method in which when glow discharge is conducted in a vacuumed inert gas atmosphere, the gas ions are driven to collide with the cathode (i.e. the target) to evaporate the cathode material in a form of atoms or groups of atoms and the sputtered metal atoms are deposited on a substrate disposed close to the anode, thereby to form thin metal layer on the substrate. A magnetron type sputtering device in which a magnet is disposed behind the cathode (i.e. the target) so that a magnetic field is oriented to be perpendicular to the electric field in the discharge space, is particularly effective to prevent the temperature raise of the substrate. This magnetron type sputtering device is designed so that electrons generated by the discharge are turned by the magnetic field and permitted to drift, whereby the electrons are prevented from flowing to the substrate which is disposed to face the cathode and the temperature raise of the substrate is thereby suppressed. Another advantage is that the magnetron type sputtering device makes high speed sputtering possible.

It has been unexpectedly found that with use of such a sputtering method, it is possible not only to prevent the raise of the substrate temperature but also to increase the saturated magnetic flux density as much as several times that of the Mn—Al—Cu layer obtainable by the vapour deposition method. This is considered attributable to the fact that the energy of the atoms plunging into the substrate in the sputtering method is far greater than that in the vapour deposition method.

In the present invention, it is preferred that Cu is incorporated in an amount of at most 25% by weight and the rest of at least 75% by weight is composed of a predetermined proportion of Mn and Al and unavoidable impurities. The ratio of Mn:Al is within a range of from 65:35 to from 75:25 by weight. The most optimum ratio is 71:29 by weight. If the ratio departs from the optimum ratio, the magnetic property weakens sharply and if the ratio departs from the above range, the ferromagnetic property is lost. As mentioned above, Cu may be incorporated in an amount of at most 25% by weight.

However, it is preferably incorporated in an amount of from 5 to 20% by weight.

The thickness of the layer is preferably within a range of from 0.1 to 1.0 μm. If the thickness is less than 0.1 μm, the SN ratio tends to be inferior. On the other hand, if the thickness exceeds 1.0 μm, it becomes impossible to obtain a high density recording.

The substrate may be made of any material which is commonly used for magnetic recording media. Preferred materials for the substrate include polymers such as polyester, polyimide, and polyamide.

Now the invention will be described in further detail with reference to an Example.

EXAMPLE

A thin Mn—Al—Cu layer was formed by means of a high frequency magnetron sputtering device. The layer was composed of 7% by weight of Cu and the rest of 93% by weight being composed of Mn and Al in a weight ratio of Mn:Al being 71:29. The conditions for the sputtering were such that the background gas pressure was $5.0 \times 10^{-7}$ Torr (in the chamber), the Ar gas flow rate (as represented by the pressure in the chamber when Ar was supplied in an equilibrium condition) was $4.0 \times 10^{31\ 3}$ Torr, the Ar gas pressure was $4.0 \times 10^{-3}$ Torr (i.e. the direct flow), the high frequency electric power was 1.6 kW and the substrate temperature was 230° C. The substrate was a polyimide film and the sputtering time was 5 minutes.

The magnetic properties of the layer thus formed were measured, whereby the coercive force was 520 Oe, the saturated magnetic flux density was 4,270 G and an angular ratio was 0.57. These magnetic properties were suitable for a magnetic recording medium. Particularly, the saturated magnetic flux density was as high as several times that of a similar layer obtained by the vapour deposition method.

Then, sputtering was carried out under the same conditions as above by varying the proportion of Cu. The magnetic properties of the layers thereby formed were measured. Mn and Al constituting the rest of the composition other than Cu were maintained at a constant weight ratio of 71:29. The results thereby obtained are shown in the graph of FIG. 1.

From the graph, it is seen that the proper proportion of Cu is at most 25% by weight. It is seen that within the range where the proportion of Cu is from 5 to 20% by weight, it is possible to obtain materials having a high saturated magnetic flux density without substantial reduction of the coercive force.

As described in the foregoing, according to the present invention, a thin magnetic Mn—Al—Cu metal layer having magnetic properties suitable for a magnetic recording medium has been successfully formed on a polymer substrate by means of a sputtering method, particularly a magnetron sputtering method without leading to thermal degradation or damage of the substrate. The present invention makes it possible to produce a thin magnetic metal layer composed solely of readily available materials and being useful for a high density recording medium which is expected to be increasingly in demand in the future. Thus the present invention contributes to this technical field to a great extent.

We claim:

1. A magnetic recording medium comprising a substrate of a polymer selected from the group consisting of polyester, polyimide and polyamide, and a thin magnetic metal layer formed on said substrate by a sputtering method, said magnetic metal layer consisting essentially an alloy of maganese and aluminum containing of 5-20% by weight of copper, the weight ratio of Mn:Al being within the range from 65:35 to 75:25, the thin magnetic metal layer having a thickness of from 0.1 to 1.0 μm, a minimum coercive force of 300 Oe, and a minimum saturated magnetic flux density of 1500 G, the sputtering being conducted at a low substrate temperature enabling use of said polymer substrate.

2. The magnetic recording medium according to claim 1 wherein the thin magnetic metal layer is formed by a magnetron sputtering method.

3. The magnetic recording medium according to claim 1 wherein the weight ratio of Mn:Al is about 71:29.

* * * * *